United States Patent
Chen

(10) Patent No.: US 11,190,348 B2
(45) Date of Patent: Nov. 30, 2021

(54) SYSTEM FOR USE IN QUANTUM ENCRYPTION, DECRYPTION AND ENCODING

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 101 days.

(21) Appl. No.: 16/801,174

(22) Filed: Feb. 26, 2020

(65) Prior Publication Data

US 2021/0203493 A1 Jul. 1, 2021

(30) Foreign Application Priority Data

Dec. 31, 2019 (TW) ................. 108148646

(51) Int. Cl.
*H04L 9/08* (2006.01)
*G06F 17/14* (2006.01)

(52) U.S. Cl.
CPC ............ *H04L 9/0852* (2013.01); *G06F 17/14* (2013.01); *H04L 2209/34* (2013.01)

(58) Field of Classification Search
CPC . H04L 9/08; H04L 9/00; H04L 9/0852; H04L 29/06; H04L 9/30; G01D 18/00; G06F 17/14; H04W 12/04; H04B 10/532; H04B 10/135; H04B 10/50; H04B 10/11; H04B 10/2575; G01J 1/44; H03K 17/78
See application file for complete search history.

(56) References Cited

U.S. PATENT DOCUMENTS

| | | | | |
|---|---|---|---|---|
| 7,639,809 B2 * | 12/2009 | Debuisschert | ........ | H04L 9/0852 380/256 |
| 8,385,548 B2 * | 2/2013 | Kanter | .................. | H04B 10/70 380/263 |
| 9,264,225 B1 * | 2/2016 | Hunt | ..................... | H04L 9/0852 |
| 9,819,418 B2 * | 11/2017 | Nordholt | .............. | H04B 10/501 |
| 2004/0052373 A1 * | 3/2004 | Debuisschert | ........ | H04L 9/0858 380/255 |
| 2004/0190725 A1 * | 9/2004 | Yuan | ...................... | H04B 10/25 380/283 |
| 2011/0127415 A1 * | 6/2011 | Kanter | .................. | G01D 18/00 250/252.1 |
| 2016/0248582 A1 * | 8/2016 | Ashrafi | .............. | H04B 10/5161 |

* cited by examiner

*Primary Examiner* — Thanhnga B Truong

(57) ABSTRACT

A system for use in quantum encryption, decryption, and encoding, comprises a photon production sub-system, a transmission channel sub-system, and a data encoding sub-system. The transmission channel sub-system makes use of the combination of quantum state vectors derived from the photon production sub-system for optical communication with quantum key. The data encoding sub-system includes a plurality of dynamic data encoding modules, and at least one of these modules performs to express the quantum key with bases in an individual Hilbert Space, and divides the transmitting data into segments for data encoding with the individual space bases. In addition to the use in data encoding, the sub-system can also improve the signal-decays and the eavesdropping issue within the quantum channel via implementation of the Laplace Transformation unit and the Quantum Fourier Transformation unit.

10 Claims, 7 Drawing Sheets

SYSTEM FOR USE IN QUANTUM ENCRYPTION, DECRYPTION AND ENCODING

CROSS-REFERENCE TO RELATED APPLICATION

This non-provisional application claims priority under 35 U.S.C. § 119(a) on Patent Application No(s). 108148646 filed in Taiwan, R.O.C. on Dec. 31, 2019, the entire contents of which are hereby incorporated by reference.

BACKGROUND OF THE INVENTION

1. Field of the Invention

The present invention relates to a cryptography system, and in particular, to a system or solutions with procedures or methods for use in quantum encryption, decryption, and encoding.

2. Description of the Related Art

Current common quantum encryption key technologies mostly use known academic theories (such as BB84, SARG04, E91, and so on) to implement quantum key distribution process to work with known encryption, decryption, and encoding methods. However, the current implementations may not be able to provide enough complexity in the inverse function against quantum computing with a significant number of Qubits, and it requires both a traditional channel and a quantum channel in prior arts to complete the derivation and authentication processes for the usage of quantum keys. It will be exposed to cyber risks such as Replay Attack or DDoS Attack caused by a large number of data with junk encoding, if users still need to perform any transmission process in traditional channels.

In addition, even though it completes the related key derivation and authentication processes only via the quantum channel, we have to handle the signal-decay issues that may lead to the instability of transmission. Therefore, it is desirable to have improvements on the conventional approach.

BRIEF SUMMARY OF THE INVENTION

In view of the drawbacks of the prior arts, it is a primary object of the present invention to provide a system for use in quantum encryption, decryption, and encoding, and the system can complete the related quantum key delivery (or distribution) processes only with single quantum channel without traditional channels. Based on the above scheme, we can also get ways to overcome the issues of signal-decays and eavesdropping attacks in advance. The related technologies can be implemented as a device or system with high security strength for the use of quantum encryption, decryption, and encoding.

To achieve the above object, a system is provided according to an aspect of the present invention for use in quantum encryption, decryption, and encoding. The system includes a first sub-system comprising the following units: a quantum beam source generator, with frequency adjustment function, controlling the output frequency at least in a range with a full set of energy levels for a specific frequency spectrum; a photon production module, being able to configure a plurality of quantum states, and to generate a series of photons with different combinations of quantum states by configuring multiple property parameters; and a plurality set of quantum-state measurement module, being capable of confirming the quantum states for the derived photons.

In an embodiment, working through the first sub-system, we can make use of a key-base combination pre-unit to select some candidate key bases according to some combinations of confirmed quantum states. A key base could be a combination of some quantum states. After the candidate key bases are filtered by passing through a filter module, it can be output as a key-base combination for deriving a quantum key. In an embodiment, the filter module includes: a unit of Bell Measurement, a unit of filter for maximum entanglement, a unit of filter with entropy calculation, and a unit of filter for DOF (degree of freedom). The unit of Bell Measurement is for dropping the non-entanglement combinations; by dropping the combination with maximum entanglement, the unit of filter for maximum entanglement can assure the performance of signal recovery processes for noise interferences; the unit of filter with entropy calculation is for reducing the impact of information loss, by dropping the entanglement with a threshold value of Von Neumann Entropy; and the unit of filter for DOF is performing to reduce the decoherence issue, by dropping the combination with a threshold of DOF. Although each of the above units is a description of prior arts, to combine them as a filter module can help to drop the improper photon states, and can keep generating useful photons for deriving qualified quantum key in efficiency.

In an embodiment, in advance, the first sub-system also includes a photon delayed-process controller, wherein the controller performs determent process to decide if the first sub-system should delay the processes performed by the quantum beam source generator and the photon production module. The photon delayed-process controller comprises: a flux regulator of electromagnetic induction, an optical refractive component (ex: a prism, or a photonic crystal), and an optical chopper. Although each of the above objects is a description of prior arts, to combine them as a photon delayed-process controller can help to drive the delayed-process for continuous photon production processes according to the production quality of the derived photons.

In an embodiment, in advance, there's another sub-system (named the second sub-system here) comprising: a single photon output unit, for example, wherein the output unit includes a silicon or compound based integrated-circuit component with single photon conduction function; and an optical communication channel, for example, wherein the optical channel includes a key generator module, a steering unit for multiple photons, and a decoding unit for multiple photons for quantum teleportation. Although each of the above objects is a description of prior arts, to combine them as a second sub-system can help to generate quantum key via single photon output unit working with the key generator module, and then make use of the steering unit for multiple photons to perform the key authentication and delivery processes within the quantum channel.

In an embodiment, the key generator module under the above second sub-system includes the following units: a transmission unit for photons with shared entanglement for the delivery of photons with shared entanglement; a quantum-refereed unit wherein this unit coupled to the transmission unit for photons with shared entanglement makes use of 3D entanglement to perform quantum refereed to verify the current photon combination with a confirmed key configuration; and a "Key Debugger Unit" wherein this debugger unit can help the key receiver to reverse the received quantum key to determine if the received key is correct, and determine if the receiver should request the key transceiver to resend the quantum key.

In an embodiment, the steering unit for multiple photons under the above Second Sub System is a classic quantum steering unit including the following components for enhancement: a quantum channel identification component, wherein the identification component encrypts the appointed (or intended) identity code with the quantum key first, and then helps to send the encrypted identity code from the transceiver to the receiver to perform the authentication processes within the quantum channel for data transmission; a superdense coding component for multiple photons wherein this component works with a plurality of polarizers to generate a superdense photon entanglement configuration, and confirms if the elements of the generated configuration belongs to a permutation group and if there are inverses for the elements in the permutation group in order to determine if rearrangement of the configuration is needed; a computing component for Pauli Matrices wherein this component performs to transfer the superdense photon entanglement configuration to an expression in the type of Pauli Matrices; a detector component of encoding type wherein this component performs the following procedures first: 1) to assemble the divided data segments with a proper mechanism; 2) to verify the data length according to the information embedded in some field of the assembled data header; 3) to verify if the assembled data still fits the superdense coding configuration; and then performs the key inverse function to decrypt the encrypted encoded data to get the first level result (the raw encoded data), and further helps the receiver to detect the data encoding type of the quantum channel according to the original encoding message embedded in the header of the first level result; and a One-Hot encoding controller component wherein this component assures that each identity code for a quantum channel is in the type of one-hot encoding. Although each of the above components is a description of prior arts, to combine them as a steering unit for multiple photons not only helps to generate proper identity code with high secure strength for a quantum channel (such as an optical communication channel) to complete required channel authentication processes in efficiency, but also can be applied to secure key exchange or delivery, noise resistant application, and implementation of compressed encoding.

Among some embodiments, the present invention provides a data encoding sub-system comprising the following units: a plurality of dynamic data encoding module wherein this module, the above quantum key and data to be transmitted are conducted into at least one random dynamic data encoding module from the plurality, here each dynamic data encoding module owns its specific Hilbert Space transformation unit; a shared Laplace Transformation unit performing the processes for Laplace Transformation; and a shared Quantum Fourier Transformation unit performing the processes for Quantum Fourier Transformation. Although each of the above units is a description of prior arts, to combine them as a data encoding sub-system can help to transform the quantum key into an individual Hilbert Space base via the Hilbert Space transformation unit, and then divides the raw data into segments to make the divided data work with the selected space base to generate the encoded data finally. For example, the data encoding sub-system can make several different divided data be expressed in several different Hilbert Spaces in multiple dimensions with different space bases to get encoded data with super security strength based on reasonable and affordable devices.

Besides, in an embodiment, the above Hilbert Space transformation unit performs the following steps in advance: 1) working with the Laplace Transformation unit under the data encoding sub-system to output a set of corresponding Lorenz equations with a Lorenz attractor for the data to be transmitted; 2) performing the receiver side to conduct the above Lorenz equations into the Quantum Fourier Transformation unit for process of the qubits circuit simulation; 3) the output result from the qubits circuit simulation will be compared with a value from non-destructive measurement to come out a noise value; 4) based on this noise value, this unit helps to determine if there's an eavesdropping or a data-loss event occurred in the transmission process, and then helps the receiver side to determine if the exception handling process should be triggered or if the receiver side should start to trigger the decryption process with the key inverse function and the quantum key. Thus, via performing the above units and steps, this embodiment can complete the full mechanism within a single quantum channel for quantum key delivery, resistance of signal-decay and eavesdropping, and solutions of data encryption, decryption, and encoding. Meanwhile, it extremely increases the complexity to reverse the data encoding process, and achieves the goal to provide both high security and convenience for data transmission with quantum key via a single quantum channel.

In an embodiment, it provides a system for use in quantum encryption, decryption, and encoding. This system includes a photon production sub-system, a transmission channel sub-system, and a data encoding sub-system.

The above photon production sub-system performs to derive required photons, and it includes: a quantum beam source generator, a photon production module, and a plurality set of quantum-state measurement module. There's frequency adjustment function within the quantum beam source generator. The photon production module connects to the quantum beam source generator, and performs to drive the quantum beam source generator to generate a series of photons with different combinations of quantum states by configuring multiple property parameters. At least one set of quantum-state measurement module is required to confirm the quantum states for the photons derived from the photon production module. At least one photon production sub-system keeps generating useful photons with the above generator and modules.

The above transmission channel sub-system makes use of the combination of quantum state vectors derived from the photon production sub-system to generate a quantum key, and it includes a single photon output unit, a quantum teleportation channel, and a key generator module. The quantum teleportation channel connects to the single photon output unit. The key generator module is coupled to the single photon output unit and the quantum teleportation channel, for working with the single photon output unit and operating with the quantum teleportation channel, to come out the quantum key.

The above data encoding sub-system includes a plurality of dynamic data encoding module, and the combination with a plurality of quantum states is taken as a kind of input parameter for data encoding. Wherein the above dynamic data encoding modules, there's at least one data encoding module performed to transfer the quantum key into an individual space base. The data encoding sub-system divides the transmitting data into segments based on the input parameter related to the number of selected dynamic data encoding modules, and then makes the divided data be encoded with the various space bases under the various selected encoding modules. (Hereinafter the transmitting data means the data which is going to be transmitted.)

In an embodiment, the quantum beam source generator includes a first sub-unit to perform the frequency adjustment function at least in a range with a full set of energy levels for a specific frequency spectrum. Based on user's configuration, the first sub-unit performs to generate Continuous-Variable entanglement photon beam.

In an embodiment, the quantum beam source generator includes a second sub-unit in advance for making use of some selected quantum states to come out the quantum state vector expressed in a Hilbert Space.

In an embodiment, the quantum beam source generator includes a third sub-unit in advance to perform a wave function computing process for the corresponding frequency.

In an embodiment, the key generator module includes a transmission unit for photons with shared entanglement, and a quantum-refereed unit. Here the quantum-refereed unit can work with the transmission unit for photons with shared entanglement in a quantum teleportation channel, and is able to trigger an event to "Key Debugger Unit" to confirm if it's needed to perform a correction process for the photons with shared entanglement, before the transmission unit for photons with shared entanglement starts to transmit the shared entanglement via the quantum teleportation channel.

In an embodiment, the transmission channel sub-system includes a steering unit for multiple photons and a decoding unit for multiple photons. The steering unit for multiple photons is a classic quantum steering unit including the following components for enhancement: a quantum channel identification component, wherein the identification component encrypts the appointed (or intended) identity code with the quantum key first, and then performs the authentication processes between the transceiver and the receiver within the quantum teleportation channel for data transmission; a superdense coding component for multiple photons to generate a superdense photon entanglement configuration; a computing component for Pauli Matrices wherein this component performs to transfer the superdense photon entanglement configuration to an expression in the type of Pauli Matrices; a detector component of encoding type wherein this component performs to get the encoding information based on the raw encoded data, and then helps the receiver to detect the data encoding type of the quantum teleportation channel; and a One-Hot encoding controller component wherein this component assures that each identity code for a quantum teleportation channel is in the type of one-hot encoding.

In an embodiment, the dynamic data encoding module includes a Hilbert Space transformation unit.

In an embodiment, the data encoding sub-system includes the following units in advance: a Laplace Transformation unit and a Quantum Fourier Transformation unit, wherein the Laplace Transformation unit and the Quantum Fourier Transformation unit are shared with a plurality of dynamic data encoding module.

In an embodiment, the single photon output unit includes silicon or compound based integrated-circuit components with functions of conducting out single photons, and this unit can perform to degenerate or renormalize the energy level of artificial quantum orbits according to the configuration of the required computing complexity.

In an embodiment, the photon production module is capable of providing at least twelve kinds of encoding basis for a quantum key.

Besides, in some other embodiments, they provide a kind of device or system using quantum features to perform processes for data encryption, decryption, and encoding wherein a quantum beam source generator with frequency adjustment function combines a photon production module which can configure a plurality of quantum states, and works with a plurality set of quantum-state measurement module and a single photon output unit; then go through a quantum teleportation channel to come out the quantum key from a key generator module which includes a steering unit for multiple photons. The generated quantum key and the transmitting data will be conducted into a plurality of dynamic data encoding module which takes the combination of multiple quantum states as a kind of input parameter for the data encoding processes. In an embodiment, besides performing the data encoding processes, the system can also improve the signal-decay issue and the eavesdropping issue within the quantum channel via performing the Laplace Transformation unit and the Quantum Fourier Transformation unit under this system. In an embodiment, the receiver side can get the data with high strength encoding within a quantum channel and perform the decryption processes with the quantum key within the same channel.

Besides, in some other embodiments, they provide a kind of system for use in quantum data encryption, decryption, and encoding wherein the system comprises photon production sub-system, transmission channel sub-system, and data encoding sub-system. The transmission channel sub-system makes use of the combination of quantum state vectors derived from the photon production sub-system to generate the quantum key for transmitting the identity code, redundancy or padding data, and attribute information with photons, and the sub-system may include a decoding unit for multiple photons to perform decoding processes in advance for full implementation. The data encoding sub-system includes a plurality of dynamic data encoding module wherein the modules, there's at least one data encoding module performed to transform the quantum key into a base of an individual Hilbert Space, and then the data encoding sub-system divides the transmitting data into segments based on the input parameter related to the number of selected dynamic data encoding modules, and then come out the encoded data with the related data encoding modules. Besides, in an embodiment, not only performs the data encoding processes, the above sub-system but also improves the signal-decay issue and the eavesdropping issue via implementing the Laplace Transformation unit and the Quantum Fourier Transformation unit. In an embodiment, the receiver side can get the data in advance with high strength encoding within a quantum channel and perform the decryption processes with the quantum key within the same channel.

According to the related descriptions, the above several embodiments of the present invention can perform the scheme of encryption, decryption, and encoding only within a single quantum teleportation channel, and can perform to improve the signal-decay issue and the eavesdropping issue in advance. This technology can be performed as a device or system with high strength scheme of quantum decryption, encryption, and encoding, and can be performed on both of the transceiver side and the receiver side for data communication. In some embodiments, this technology can complete the mechanisms for generating quantum keys, avoiding signal-decay issues, overcoming eavesdropping attacks, and data encryption, decryption, and encoding within a single quantum channel, and increases the complexity to reverse the data encoding process, and achieves the goal in advance to provide both high security and convenience for data transmission with quantum key.

DETAILED DESCRIPTION OF THE INVENTION

Figure 1:
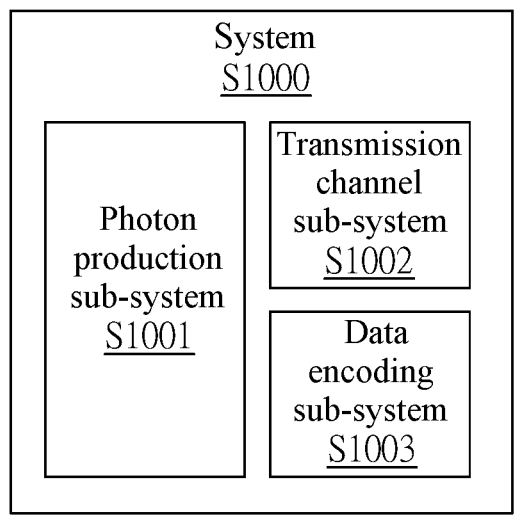
FIG. 1 is a structural block diagram of a system according to a preferred embodiment of the present invention.

To facilitate understanding of the object, characteristics and effects of this present disclosure, embodiments together with the attached drawings for the detailed description of the present disclosure are provided.

An embodiment in regard to a system for use in quantum encryption, decryption, and encoding which can be performed with the mechanism of encryption, decryption, and encoding for data transmission only via a quantum teleportation channel is provided as below. In an embodiment of this aspect, the system can improve and even overcome the issues of signal decay and eavesdropping attacks in advance. In some embodiments, this technology can be performed as devices and system with high strength mechanisms of quantum encryption, decryption, and encoding separately; for example, it can be performed as systems (or devices) on the transceiver side and the receiver side or as a communication system which covers both of the transceiver side and the receiver side.

For instance, as a system for use in quantum encryption, decryption, it should include a photon production sub-system, a transmission channel sub-system, and a data encoding sub-system at least. The transmission channel sub-system makes use of the combination of quantum state vectors derived from the photon production sub-system to generate the quantum key for transmitting the identity code, redundancy or padding data, and attribute information with photons, and the sub-system may include a decoding unit for multiple photons to perform decoding processes in advance for full implementation. The data encoding sub-system includes a plurality of dynamic data encoding module wherein the modules, there's at least one data encoding module performed to transform the quantum key into a base of an individual Hilbert Space, and then the data encoding sub-system divides the transmitting data into segments based on the input parameter related to the number of selected dynamic data encoding modules, and then come out the encoded data with the related data encoding modules. Besides, the data encoding sub-system not only performs to deal with data encoding processes, but also can improve the signal-decay issue and the eavesdropping issue by implementing the Laplace Transformation unit and the Quantum Fourier Transformation unit in advance. In an embodiment, on the receiver side, the sub-system can receive high strength encoded data via a quantum channel and decrypt it with the quantum key in advance.

In regard to a device or system for use in quantum encryption, decryption, and encoding (to be referred to as a system S1000 hereinafter) according to a preferred embodiment of the present invention, referring to FIG. 1, the system S1000 includes a photon production sub-system S1001; a transmission channel sub-system S1002; and a data encoding sub-system S1003.

The above photon production sub-system S1001 comprises: a quantum beam source generator D101 with the function of frequency adjustment; a photon production module D102; and a plurality set of quantum-state measurement module D1031~D1036.

Figure 3:
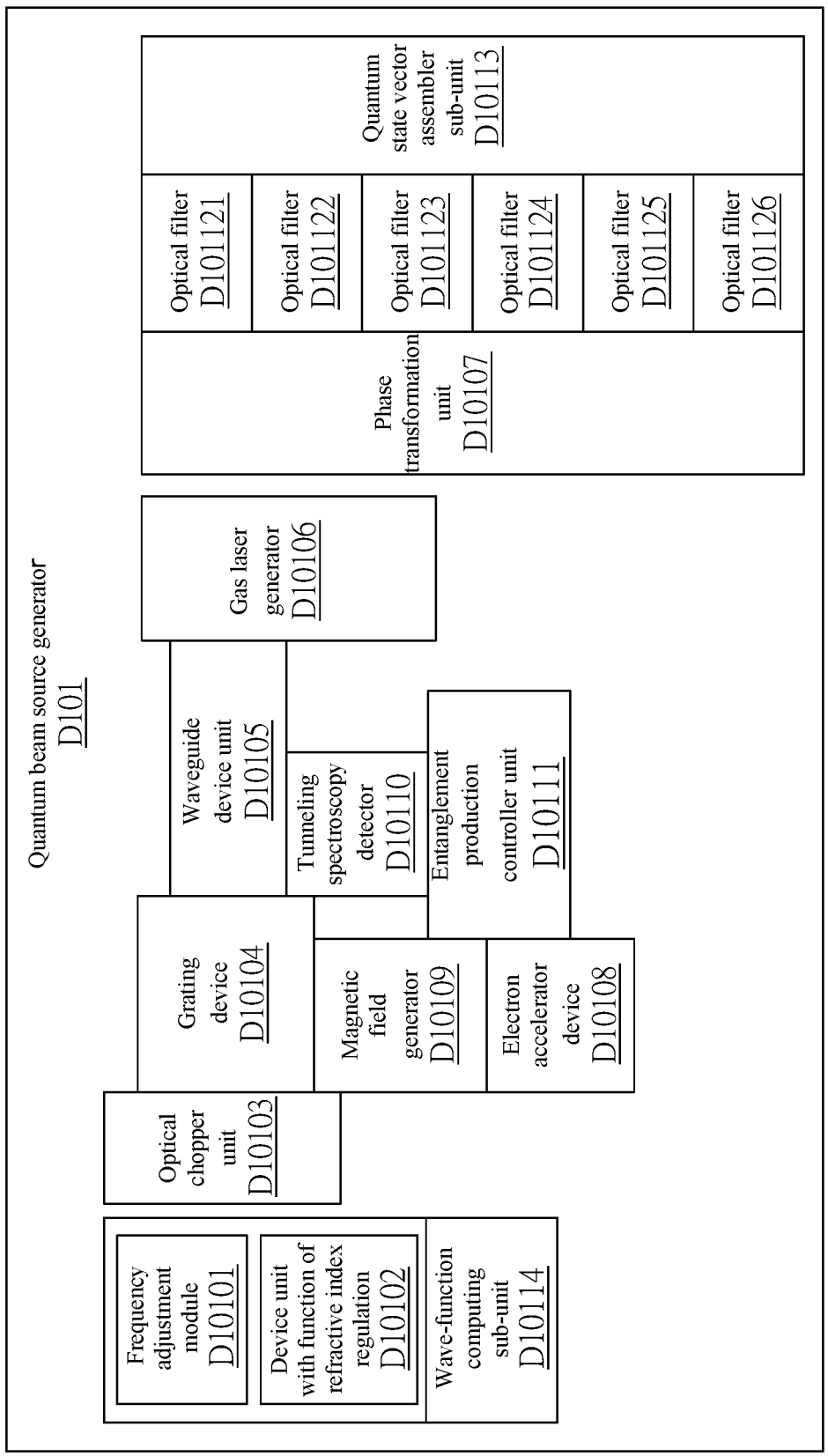
FIG. 3 is a structural block diagram of a quantum beam source generator according to a preferred embodiment of the present invention.

Referring to FIG. 3, for instance, the quantum beam source generator D101 comprises: a frequency adjustment module D10101 which can work in a range of specific frequency spectrum (like EUV) wherein this band covers at least a full set of energy levels (covering four energy levels at least), to adjust the beam frequency; a device unit with function of refractive index regulation D10102 to work with the operation of D10101; an optical chopper unit D10103 to stabilize the beam source and avoid the interference from other beam frequency; a grating device D10104 with specific designs for deriving multiple polarized entanglement photons; a waveguide (ex: Lithium niobate LiNbO3) device unit D10105 for specifically matching with D10104; a gas laser generator D10106 performing plasmon excitation process for the beam generated with configured frequency; a phase transformation unit D10107 to perform phase transformation based on the combination of infrared phases; an electron accelerator device D10108 to trigger and accelerate electrons; a magnetic field generator D10109 to control the path, direction, and energy for the accelerated electrons generated from D10108; a tunneling spectroscopy detector D10110 to detect the tunneling spectroscopy for D10104; an entanglement production controller unit D10111 wherein this unit can drive the accelerated electrons generated from D10108 to make use of the quantum tunneling effect occurred in D10104 to generate the required entanglement based on the property parameter related to photon's spin angular momentum; a plurality of optical filter (ex: polarizer or other optical components for specific photon property) D101121~D101126 in order to filter out the configured combination of entanglements from the entanglements continuously derived from D10104. Taking an example for this embodiment, we can make use of two or more than two of the above optical filters with some specific permutation or arrangement for required configurations. However, the presentation of this invention is not limited by the above example. For instance, the number of the optical filters in use can be six, more than six, or other proper configurations.

Further, the above quantum beam source generator D101 also comprises two more attached sub-units: one is a quantum state vector assembler sub-unit D10113 wherein this sub-unit performs assembling the selected quantum states and expressing them as the quantum state vectors in a Hilbert Space; and another one is a wave-function computing sub-unit D10114 to perform a wave function computing processes according to the corresponding configured frequency. Although each of the above objects is a description of prior arts, to combine them as a quantum beam source generator not only helps to generate stable beam source for the key generating process, but also helps to provide beam source with different frequencies in efficiency. Moreover, once the material of the above grating device D10104 is designed to adopt the combination of topological materials (ex: topological insulator) and photonic crystal, the quantum beam source generator D101 will be able to keep providing various entanglements efficiently since D10104 can apply various quantum tunneling effects with such specific design. In addition, the wave-function computing sub-unit D10114 attached to the quantum beam source generator D101 not only for wave-function calculation, but also can help to find some candidate frequencies for interference insistence, and also can help to verify the derived quantum state vectors, thus the D10114 can couple to D101 to maintain the transmission quality for the quantum channel as well. Hence, this quantum beam source generator can be performed with reasonable devices without taking up large spaces, within general environment of usual living, and with cost-effective implementations.

In this preferred embodiment, the above photon production module D102 which is mentioned in the photon production sub-system S1001, should provide configurations with at least three different property parameters (ex: spin parameter) to drive D101 to generate various quantum states continuously, and be able to output the combination with at least 12 candidate basic quantum states as quantum key bases. Here this invention treats the basic quantum states as the basic encoding operator, and each basic quantum state is expressed as a basis in a Hilbert Space. The above a plurality set of quantum-state measurement module D1031~D1036 which is also mentioned in the photon production sub-system S1001, is configured to verify the generated combination of quantum states. Besides, in some other embodiments, the number of candidate basis could be 11, 10, or others. However, the presentation of this invention is not limited by the above embodiments.

Figure 2A:
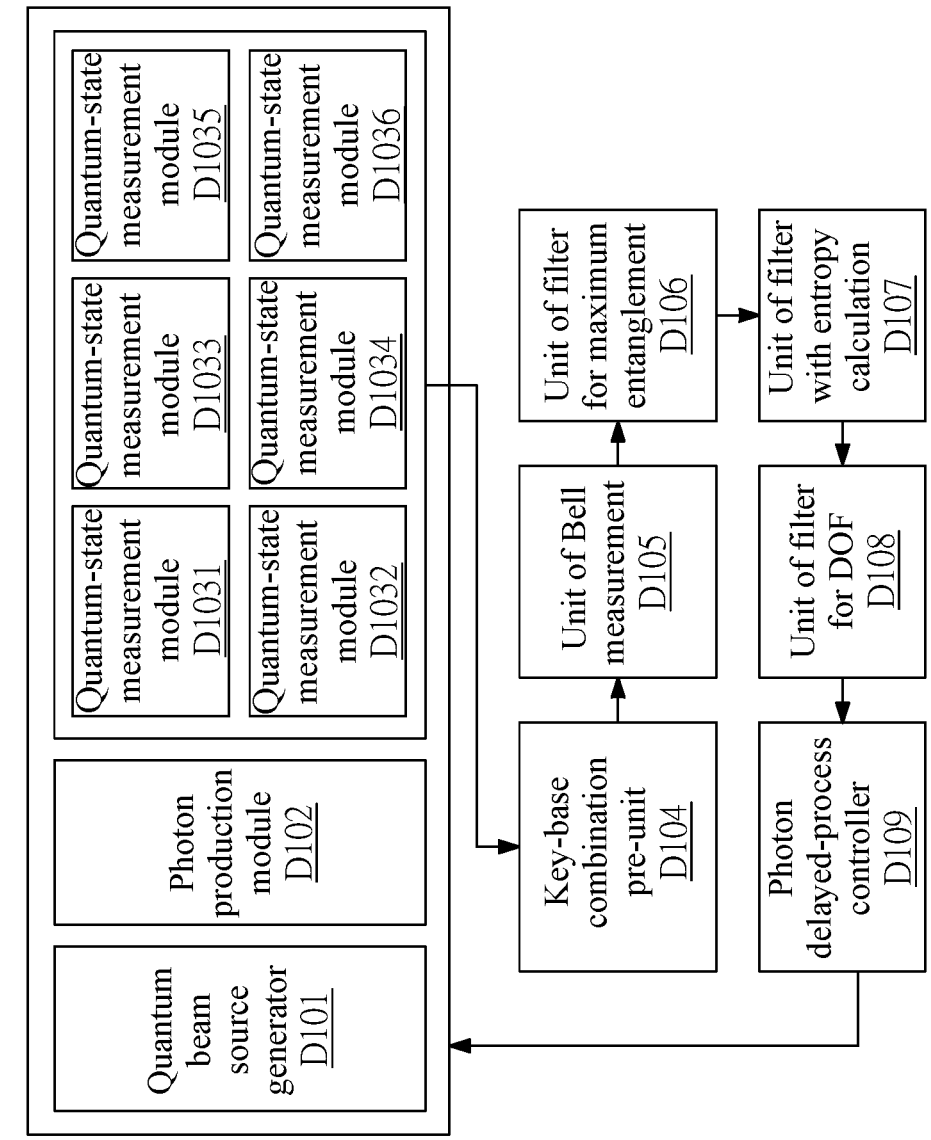
FIG. 2A is a structural block diagram of a photon production sub-system according to a preferred embodiment of the present invention.

Referring to FIG. 2A, the sub-system S1001 can select some candidate combinations of quantum states as the input to key-base combination pre-unit D104, and then drives D104 to output the pre-key bases. Next, the sub-system S1001 performs to make the pre-key bases be filtered by a filter module to be the official combination of quantum states for key generator. In an embodiment, here the filter module comprises the following units: a unit of Bell Measurement D105, a unit of filter for maximum entanglement D106, a unit of filter with entropy calculation D107, and a unit of filter for DOF D108. For instance, via the unit of Bell Measurement D105, if the result of measurement cannot fit Bell's Inequality that means the entanglement is reasonable wherein this unit can help to drop the combination which comes with unreasonable entanglement; in the next stage, the sub-system S1001 makes the bases of each combination be filtered by the unit of filter for maximum entanglement D106 to drop the combination with maximum entanglement that assures some interfered signals can be recovered by Hermitian operation processes; further, S1001 makes the bases of combination be filtered by unit of filter with entropy calculation D107 to drop the one if its Von Neumann entropy of the entanglement exceeds a configured threshold that helps to reduce the data loss issues; and then works with the unit of filter for DOF D108 to drop the combination if its degree of freedom exceeds a configured threshold that helps to reduce the quantum decoherence issues. Although each of the above units is a description of prior arts, to combine them as a filter module not only helps to drop improper photon states, but also helps to keep generating useful and required photons in efficiency. For example, the key-base combination pre-unit D104 or the entire filter module can be implemented by embedded system, programmable circuits, specific circuits, other circuits or chips, or any combination of above descriptions; wherein the programmable circuits could be Field Programmable Gate Array (FPGA), Application-specific Integrated Circuit (ASIC), Micro Control Unit (MCU), Signal Processor, or other similar circuits. However, the presentation of this invention is not limited by the above examples.

Figure 2B:
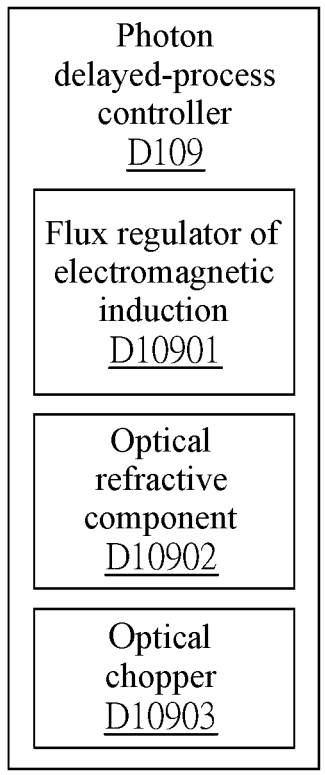
FIG. 2B is a block diagram of a photon delayed-process controller according to a preferred embodiment of the present invention.

Besides, the sub-system S1001 can include a photon delayed-process controller D109 in advance to determine if the sub-system S1001 should trigger the delayed-process to slow down the photon derivation processes from D101 and D102. As shown in FIG. 2B, in an embodiment, a photon delayed-process controller D109 includes: a flux regulator of electromagnetic induction D10901, an optical refractive component D10902, and an optical chopper D10903. To combine the above objects as a photon delayed-process controller, once S1001 determines the sub-system should delay part of the photon derivation processes to improve the photon output quality, the controller D109 can work for it seamlessly.

Figure 4A:
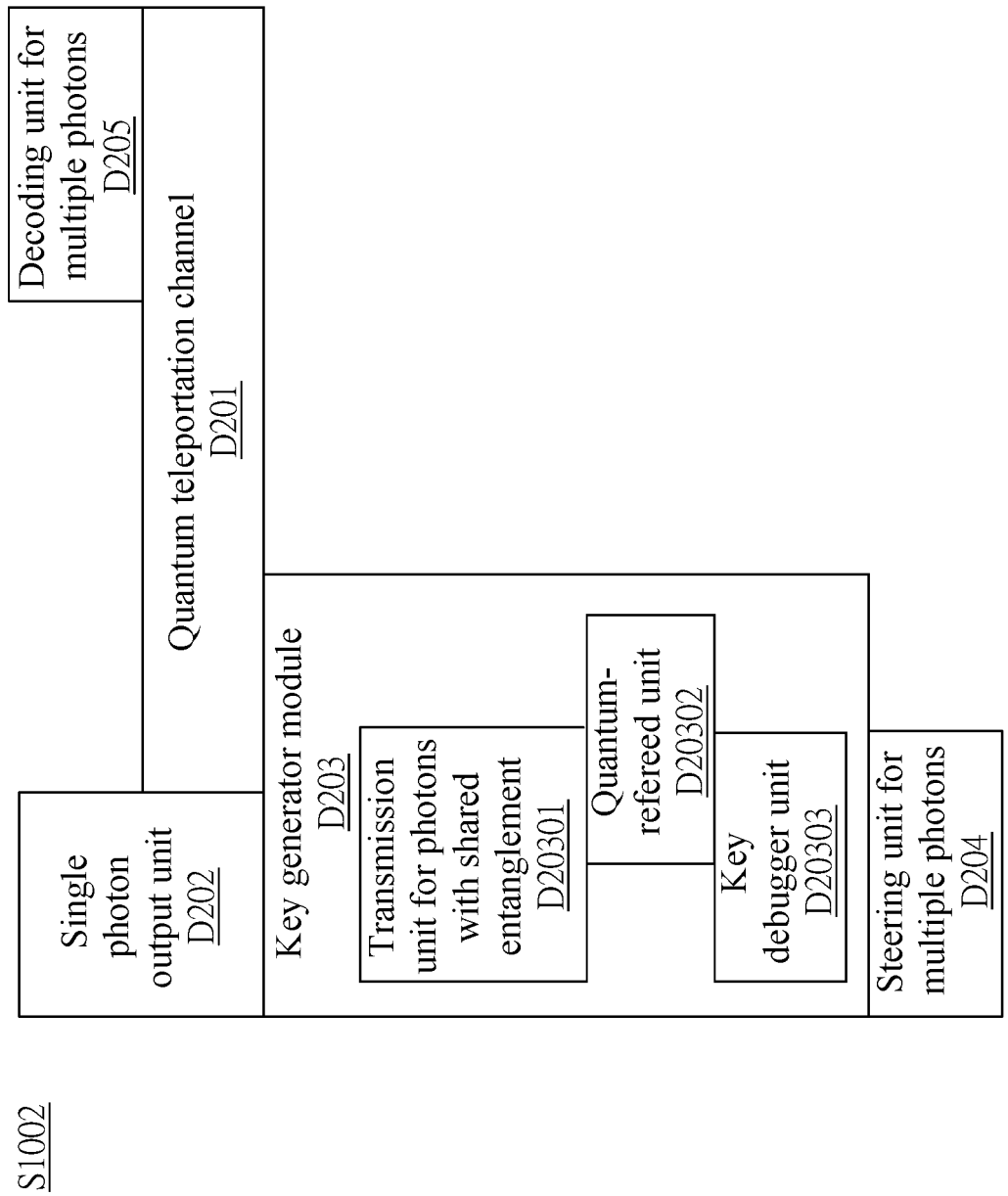
FIG. 4A is a structural block diagram of a transmission channel sub-system according to a preferred embodiment of the present invention.

For example, the above transmission channel sub-system S1002 can include at least a "quantum teleportation channel", and a quantum key delivery module wherein this module comprises the implementations of a single photon output unit, a key generator module, and a steering unit for multiple photons in advance. As shown in FIG. 4A, in an embodiment, the above transmission channel sub-system S1002 includes: a quantum teleportation channel D201 based on an optical communication channel for transmission of photon states and quantum messages (ex: quantum key, or encoded data); a single photon output unit D202 which includes a silicon or compound based integrated-circuit component with single photon conduction function or other integrated-circuit component for conducting out single photons; a key generator module D203 working with the single photon output unit D202 to perform optical communication with quantum key in the quantum channel D201; a steering unit for multiple photons D204 for transmission with quantum steering; and a decoding unit for multiple photons D205 to perform the decoding processes for data transmission in D201. The sub-system S1002 drives the single photon output unit D202 to work with the key generator module D203 to get the official quantum key first, and then make use of the steering unit for multiple photons D204 and D202 to perform the authentication processes via the quantum teleportation channel D201 and the decoding unit for multiple photons D205.

Wherein the above single photon output unit D202, for instance, a silicon or compound based integrated-circuit component with single photon conduction function, can perform to degenerate or renormalize the energy level of artificial quantum orbits according to the configuration of the required computing complexity in advance, and that helps to regulate the expiration for each photon entanglement; besides, the above key generator module D203 is comprising the following units: a transmission unit for photons with shared entanglement D20301 for transmitting the selected photons which own shared entanglement; a quantum-refereed unit D20302 making use of 3D entanglement to perform quantum refereed to verify the current photon combination with a confirmed key configuration; and a key debugger unit D20303 wherein this debugger unit can help the key receiver to reverse the received quantum key to determine if the received key is correct, and determine if the receiver should request the key transceiver to resend the quantum key; in addition, the key debugger unit D20303 implemented on the transceiver side, can also accept an event sent from the quantum-refereed unit D20302, to confirm if it's needed to perform a correction process for the photons with shared entanglement, before the transmission unit for photons with shared entanglement D20301 starts to transmit the shared entanglement via the quantum teleportation channel D201.

Figure 4B:
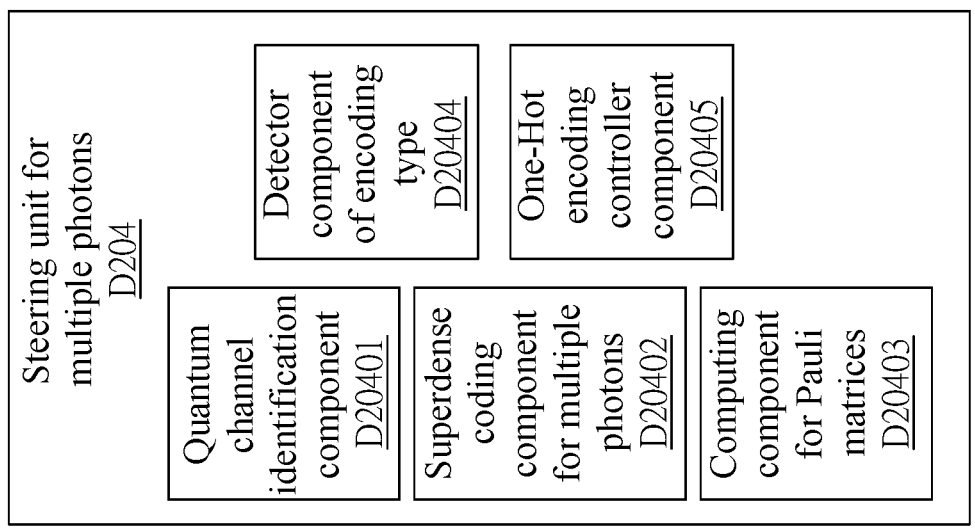
FIG. 4B is a block diagram of steering unit for multiple photons according to a preferred embodiment of the present invention.

As shown in FIG. 4B, in an embodiment, the above steering unit for multiple photons D204 under the above transmission channel sub-system S1002 is a classic quantum steering unit for quantum teleportation, and includes the following components for enhancement: a quantum channel identification component D20401, wherein the identification component encrypts the appointed (or intended) identity code with the quantum key first, and then helps to send the encrypted identity code from the transceiver to the receiver to perform the authentication processes within the quantum teleportation channel D201 for data transmission; a superdense coding component for multiple photons D20402 wherein this component works with a plurality of polarizers to generate a superdense photon entanglement configuration, and confirms if the elements of the generated configuration belongs to a permutation group and if there are inverses for the elements in the permutation group in order to determine if rearrangement of the configuration is needed; a computing component for Pauli Matrices D20403 wherein this component performs to transfer the superdense photon entanglement configuration to an expression in the form of Pauli Matrices; a detector component of encoding type D20404 wherein this component performs the following procedures first: 1) to assemble the divided data segments with a proper mechanism; 2) to verify the data length according to the information embedded in some field of the assembled data header; 3) to verify if the assembled data still fits the superdense coding configuration; and then performs the key inverse function to decrypt the encrypted encoded data to get the first level result (the raw encoded data), and then helps the receiver to detect the data encoding type of the quantum teleportation channel D201 according to the original encoding message embedded in the header of the first level result; and a One-Hot encoding controller component D20405 wherein this component assures that each identity code for the quantum teleportation channel D201 is in the type of one-hot encoding to avoid some ambiguous conditions. Although each of the above components is a description of prior arts, besides general quantum steering function for quantum teleportation, to combine them as a steering unit for multiple photons not only helps to generate proper identity code with high secure strength for a quantum channel (such as an optical communication channel) to complete required channel authentication processes in efficiency, but also can be applied to a secure key exchange or delivery, the noise resistant mechanism, and some implementations of compressed encoding.

Figure 5:
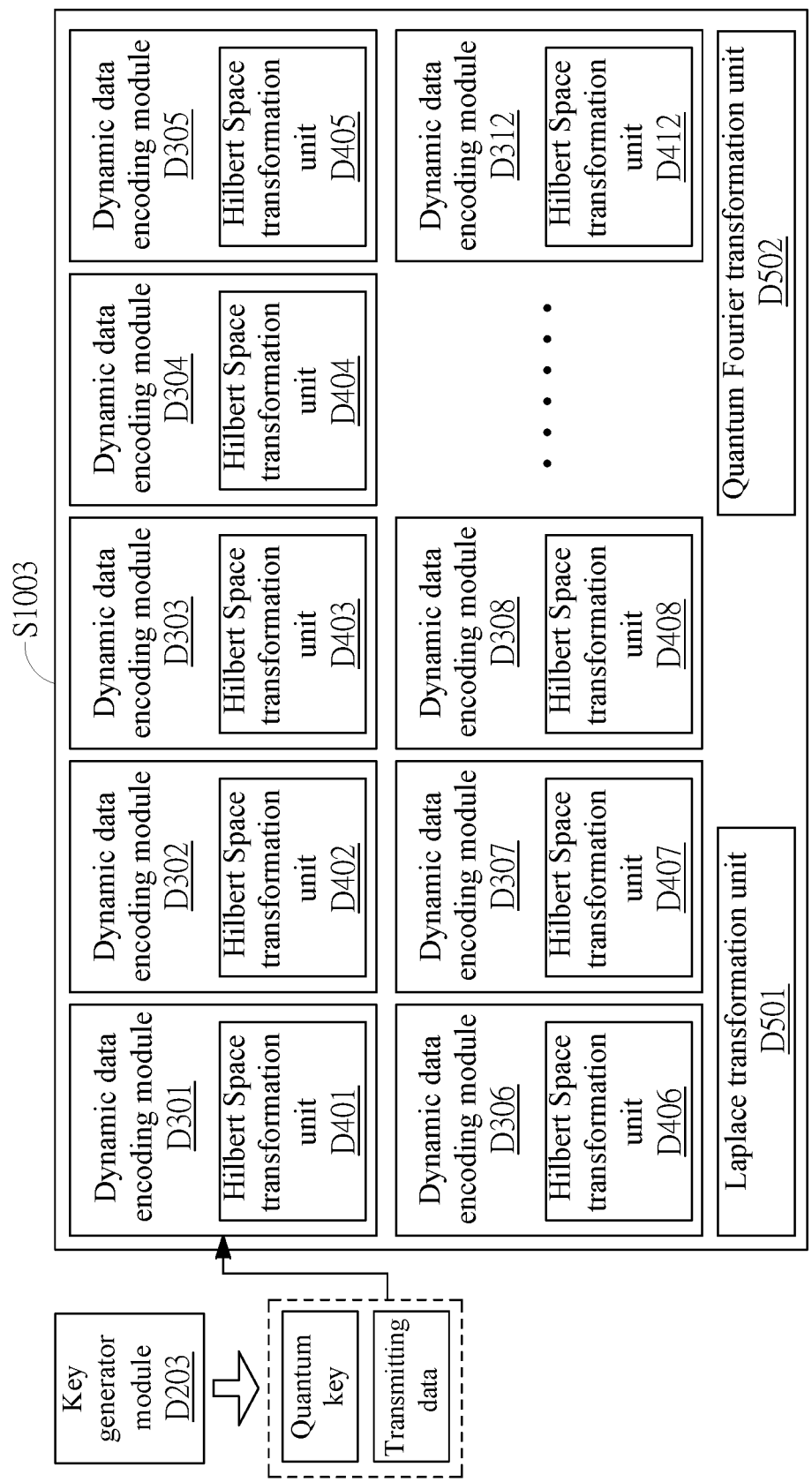
FIG. 5 is a structural block diagram of a data encoding sub-system according to a preferred embodiment of the present invention.

Referring to FIG. 1, in this preferred embodiment, the system S1000 still includes a data encoding sub-system S1003 in advance. As shown in FIG. 5, in some embodiments, the data encoding sub-system S1003 includes a plurality of dynamic data encoding module D301~D312 wherein the modules, there's at least one data encoding module (ex: D301) performed to transform the quantum key into a base of an individual Hilbert Space, and each data encoding module (D301~D312) owns its specific Hilbert Space transformation unit (D401~D412). Further, the data encoding sub-system divides the transmitting data into segments based on the input parameter related to the number of selected dynamic data encoding modules (ex: D301, D303, and D312), and each of the corresponding Hilbert Space transformation units (D401, D403, and D412) helps to transform the quantum key in the expression of bases in each Hilbert Space. Finally, the sub-system S1003 can drive each selected dynamic data encoding module (D301, D303, and D312) to work with the related bases of corresponding Hilbert Spaces to encode the divided transmitting data; for example, the divided transmitting data can be expressed in several Hilbert Spaces with different dimensions by working with different Hilbert Space transformation units (D401, D403, and D412) as the final segments of encoded data to be transmitted.

Further, in another embodiment, the Hilbert Space transformation unit (ex: D401) can perform the divided transmitting data expressed in a specific Hilbert Space to have a Lorenz Coordinate Transformation process via the Laplace Transformation unit D501 under the above data encoding sub-system S1003. Here the Laplace Transformation unit D501 can help to converge the non-linear transformation processes in rapid to simplify the procedure of differential equations, and help to analyze the Linear Superposition Property of the divided transmitting data to get the angular frequency of a Quantum Harmonic Oscillator, and then work with the Lorenz Coordinate to derive out the Lorenz Equations (with Chaos Attractor) which is corresponding to the divided transmitting data.

In some embodiments, the receiver side will conduct the above Lorenz Equations to a Quantum Fourier Transformation unit D502 under the data encoding sub-system S1003; the Quantum Fourier Transformation unit D502 adopts the above Chaos equations to perform a sampling process of "Poincar'e Section" to derive out its structure of phase space for coming out the corresponding Eigenvector and Eigenvalue, and then derive out the phase via Fourier Transformation Sampling process so that the sub-system S1003 can get the approximate solution of the Qubits via the approximation with generalized Fourier Series; and then adopts the eigenvector as basis for featuring to get a linear independent Fourier basis (orthogonal basis); so that the Quantum Fourier Transformation unit D502 can make use of a density matrix to perform the simulation of quantum decoherence, and then get the possibility of quantum pure state via a process with the Density Operator; now, D502 can perform a phase estimation based on the possibility of quantum pure state, and adopts the estimated phase to perform the Qubits circuit simulation to get a noise value by comparing the simulation result with a value from a non-destructive measurement on the receiver side; based on the above procedures, the sub-system S1003 not only can determine if there's any eavesdropping with the encoded data within the transmission process, but also can verify if there's a large number of data loss events due to signal-decays by working with the inverse function of Fourier Transformation, so that the sub-system S1003 can decide if it's time to trigger the exception handling processes or to start the decryption processes according to the reversing computing procedures with the quantum key.

Thus, the above several embodiments present the mechanisms of quantum encryption, decryption, and encoding only via a quantum channel, and they can be implemented to improve issues related to optical signal decays and eavesdropping events in advance. In some embodiments, this invention can be performed as a device or system with high strength scheme of quantum decryption, encryption, and encoding, and can be performed on both of the transceiver side and the receiver side for data communication. In some embodiments, this technology can complete the mechanisms for generating quantum keys, avoiding signal-decay issues, overcoming eavesdropping attacks, and data encryption, decryption, and encoding within a single quantum channel, and increases the complexity to reverse the data encoding process, and achieves the goal in advance to provide both high security and convenience for data transmission with quantum key.

While the present disclosure has been described by means of specific embodiments, numerous modifications and variations could be made thereto by those skilled in the art without departing from the scope and spirit of the present disclosure set forth in the claims.

What is claimed is:

1. A system for use in quantum encryption, decryption, and encoding, the system comprising:
    a) a photon production sub-system, for deriving useful photons continuously including:
        1) a quantum beam source generator with frequency adjustment function;
        2) a photon production module, connecting to the quantum beam source generator, being capable of deriving a series of photons with different combinations of quantum states by configuring multiple property parameters; and
        3) a plurality set of quantum-state measurement module, being capable of confirming the quantum states for the series of photons derived from the photon production module and the quantum beam source generator;
    b) a transmission channel sub-system, for generating quantum keys with the combination of quantum state vectors derived from the photon production sub-system, including:
        1) a single photon output unit;
        2) a quantum teleportation channel, coupled to the single photon output unit; and
        3) a key generator module, coupled to the single photon output unit and the quantum teleportation channel, for optical communication with the quantum keys; and
    c) a data encoding sub-system including a plurality of dynamic data encoding module for data encoding with input parameters regarding the different combinations of quantum states, wherein the dynamic data encoding modules, at least one dynamic data encoding module performs to express the quantum keys with bases in an individual Hilbert Space, and divides the transmitting data into segments for data encoding with individual space bases.

2. The system for use in quantum encryption, decryption, and encoding according to claim 1, wherein the quantum beam source generator comprises a first sub-unit to perform the frequency adjustment function at least in a range with a full set of energy levels for a specific frequency spectrum and to generate Continuous-Variable entanglement photon beam based on user's configuration.

3. The system for use in quantum encryption, decryption, and encoding according to claim 2, wherein the quantum beam source generator comprises a second sub-unit in advance for making use of some selected quantum states to come out the combination of quantum state vector expressed in a Hilbert Space.

4. The system for use in quantum encryption, decryption, and encoding according to claim 3, wherein the quantum beam source generator comprises a third sub-unit in advance for performing wave function computing process according to a corresponding frequency.

5. The system for use in quantum encryption, decryption, and encoding according to claim 1, wherein the key generator module comprises:
    a transmission unit for photons with shared entanglement; and
    a quantum-refereed unit, coupled to the transmission unit for photons with shared entanglement.

6. The system for use in quantum encryption, decryption, and encoding according to claim 5, wherein the transmission channel sub-system comprises: a steering unit for multiple photons, and a decoding unit for multiple photons;
    here the steering unit for multiple photons which is not only for quantum steering but also comprises the following components for enhancement:
        a quantum channel identification component, wherein the identification component encrypts and transmit the identity code with the quantum keys for both transceiver side and receiver side, and performs authentication process for data transmission via the quantum teleportation channel;
        a superdense coding component for multiple photons to generate a superdense photon entanglement configuration;
        a computing component for Pauli Matrices wherein this component performs to transfer the superdense photon entanglement configuration to an expression in the type of Pauli Matrices;
        a detector component of encoding type wherein this component performs to get the encoding information based on the decrypted result of the encoded raw data, and then helps the receiver to detect the data encoding type of the quantum teleportation channel; and
        a One-Hot encoding controller component for assuring that each identity code for the quantum teleportation channel is in the type of One-Hot encoding.

7. The system for use in quantum encryption, decryption, and encoding according to claim 1, wherein the dynamic data encoding module comprises:
    a Hilbert Space transformation unit.

8. The system for use in quantum encryption, decryption, and encoding according to claim 7, wherein the data encoding sub-system further comprises:
    a Laplace Transformation unit; and
    a Quantum Fourier Transformation unit;
    wherein the Laplace Transformation unit and the Quantum Fourier Transformation unit are shared with a plurality of the dynamic data encoding modules.

9. The system for use in quantum encryption, decryption, and encoding according to claim 1, wherein the single photon output unit includes a silicon or compound based integrated-circuit component with single photon conduction function, performing to degenerate or renormalize the energy level of artificial quantum orbits according to the configuration of the required computing complexity.

10. The system for use in quantum encryption, decryption, and encoding according to claim 1, wherein the photon production module is capable of providing at least 12 kinds of basis in a Hilbert Space as the data encoding operator.

* * * * *